United States Patent
Masunaga et al.

(10) Patent No.: US 6,334,679 B2
(45) Date of Patent: Jan. 1, 2002

(54) RIMLESS EYEGLASS FRAME AND RIMLESS EYEGLASSES EMPLOYING SUCH FRAME

(75) Inventors: Satoru Masunaga; Setsuo Sanae, both of Fukui (JP)

(73) Assignee: Masunaga Optical Mfg. Co., Ltd., Fukui (JP)

(*) Notice: Subject to any disclaimer, the term of this patent is extended or adjusted under 35 U.S.C. 154(b) by 0 days.

(21) Appl. No.: 09/757,535

(22) Filed: Jan. 11, 2001

(30) Foreign Application Priority Data

Jan. 12, 2000 (JP) .................................................. 12-003913

(51) Int. Cl.$^7$ ...................................................... G02C 1/02
(52) U.S. Cl. .............................. 351/110; 351/41; 351/124
(58) Field of Search .................................... 351/136, 137, 351/138, 139, 110, 124, 128, 129, 41

(56) References Cited

U.S. PATENT DOCUMENTS 2,068,519 A * 1/1937 Speidel .......................... 351/138
5,367,344 A    11/1994 Fuchs ............................ 351/110
5,585,870 A    12/1996 Masunaga ...................... 351/110

FOREIGN PATENT DOCUMENTS

| JP | 3007846 | 12/1994 |
| JP | 3021061 | 11/1995 |
| JP | 8-15652 | 1/1996 |
| JP | 10-206799 | 8/1998 |

\* cited by examiner

*Primary Examiner*—Hung Xuan Dang
(74) *Attorney, Agent, or Firm*—Finnegan, Henderson, Farabow, Garrett & Dunner, L.L.P.

(57) ABSTRACT

A rimless eyeglass frame and rimless eyeglasses are disclosed, which are not affected by a face width of a wearer of eyeglasses or deformation during use, and does not require adjusting operation or even required, adjustment operation can be simple. The rimless eyeglasses have left and right lenses, a wire form frame member having opposite ends and extending toward left and right, and a pair of lens holding portions arranged at center portion of the frame member and holding the left and right lenses at positions in the vicinity of inner edge portions thereof. The frame member is in non-contact with upper edge portions of the left and right lenses.

14 Claims, 12 Drawing Sheets

# RIMLESS EYEGLASS FRAME AND RIMLESS EYEGLASSES EMPLOYING SUCH FRAME

This application is based on Patent Application No. 2000-3913 filed Jan. 12, 2000 in Japan, the content of which is incorporated hereinto by reference.

BACKGROUND OF THE INVENTION

1. Field of the Invention

The present invention relates generally to an eyeglass frame. More particularly, the invention relates to a rimless eyeglass frame having no rim holding outer peripheries of eyeglass lenses and rimless eyeglasses employing such a frame.

2. Description of the Related Art

Conventionally, rimless eyeglasses have been known in the art as disclosed in U.S. Pat. No. 5,367,344 and Japanese Patent Application Laid-Open No. 10-206799 (1998), for example.

The rimless eyeglasses disclosed in U.S. Pat. No. 5,367,344 include an eyeglass frame having a lens holding portion 1, bows 2, hinge portions 3 provided at joints between the lens holding portion and the bows 2, left and right lenses 4 each having two spaced lens holes 10 formed in the vicinity of upper edge portion thereof, and two U-shaped wires 5, as shown in FIGS. 11A and 11B. The two U-shaped wires 5 are connected to the lens holding portions 1 of the eyeglass frame at corresponding positions of respective left and right lenses 4 with an offset portion 8 at the center of a connecting piece 6 which connects respective holding pins 9 as both leg portions being connected to each of the lens holding portions. Two holding pins 9 of each U-shaped wire 5 are inserted into plastic bushings 11 of the two lens holes 10. Also, a flat portion of each of the connecting piece 6 is abutted against the front face of the lens 4 so that the left and right lenses are held on the eyeglass frame 4.

On the other hand, eyeglasses disclosed in Japanese Patent Application Laid-Open No. 10-206799 (1998) is provided with fixed parts 6A and 6B of elastic members at positions corresponding to the left and right lenses 3 of the eyeglass frame (brow bar) 2, as shown in FIG. 12. One end of the fixed parts 6A and 6B are respectively inserted into bore portions 3a and 3b provided in the vicinity of both upper edge portions of the eyeglass lenses 3. Thus, the upper edge portion of the lens 3 is urged by elastic force of the elastic member onto the eyeglass frame 2 so that the left and right lenses 3 are certainly held by the eyeglass frame.

However, in such conventional rimless eyeglasses, since the eyeglass frame and each of the left and right lenses are secured with each other by connecting at two or more points, deformation caused in the eyeglass frame in response to variation of a distance (open degree) between bows or temples may result in a fluctuation of light axes of the left and right lenses fixed to the eyeglass frame.

Discussing in detail, an eyeglass frame is typically produced adapting to a standard face width of man or woman, and/or adult or child. If the eyeglass frame adapted to the standard face width is used for a wearer having a greater face width than the standard width, a distance between the bows is increased to cause intersection of the light axes of the left and right lenses. Accordingly, in such a case, in order to adapt the light axes of the left and right lenses and visual axes of the wearer, it becomes necessary to perform troublesome adjustment operations for deforming the eyeglass frame or for varying a mounting angle of the lenses to the eyeglass frame. Furthermore, if deformation such as increasing of distance between bows may be caused by repeated wear or other reason, fluctuation of the light axis of the lens may be caused in the conventional frame.

On the other hand, as another problem, it is required to process steps in forming at least two lens holes or hole portions in each of the left and right lenses. Furthermore, it is quite difficult work even for a skilled specialist to form these two lens holes at accurate position adapting to wearer or the like of astigmatic vision.

SUMMARY OF THE INVENTION

The present invention has been worked out in view of the problems in the prior art set forth above. Therefore, it is an object of the present invention to provide a rimless eyeglass frame and rimless eyeglasses which are not affected by a face width of a wearer of eyeglasses or deformation of the frame during use, and do not require any adjusting operation or even required, an adjustment operation can be simple.

In accordance with an aspect of the invention, there is provided rimless eyeglass frame comprising: a wire form frame member having opposite end portions and extending toward left and right; and a pair of lens holding means arranged at a center portion of the frame member for holding lenses; wherein the frame member is to be in non-contact with upper edges of the lenses.

In accordance with another aspect of the invention, there is provided rimless eyeglasses comprising: left and right lenses; a wire form frame member having opposite ends and extending toward left and right; a pair of lens holding means, arranged at center portion of the frame member, for holding the left and right lenses at positions in the vicinity of inner edge portions thereof; and wherein the frame member is in non-contact with upper edge portions of the left and right lens.

It should be noted that, in the present invention, "a frame member and an upper edge portion of a lens are in non-contact with each other" is used to mean to include not only that "the frame member and the upper edge portion of the lens are held out of contact with each other when no external force is exerted on the frame member", but also a slight contact between the frame member and the upper edge portion of the lens due to deformation of the frame member during in use, provided that the slight contact does not cause variation of the light axes of the left and right lenses.

With the foregoing construction, even if deformation of the frame member is caused by opening of the bows, the frame member is held in non-contact with the upper edges of the left and right eyeglass lenses so as not to cause variation of the light axes of the lenses. Therefore, no adjustment operation is required.

Here, hinges may be formed at opposite end portions of the frame member, through which bows or temples may be connected to the frame member.

With the construction set forth above, freedom in designing can be increased.

Further, the frame member may be formed with adjusting bent portions at positions between the center portion and the opposite end portions.

With the construction set forth above, adjustment depending upon a height of ears of a wearer or adjustment of fitting force to a face of a wearer and repair of deformation during use become easy. Furthermore, by even these adjustment, a mounting angle of the lenses or the like will not be influenced.

Here, the adjusting bent portion is a U-shaped configuration and both leg portions of the U-shaped adjusting bent portion are preferably arranged to overlap as viewed from a front side.

With the construction set forth above, a neat appearance can be obtained as viewed from a front side providing a fashionable appearance.

Here, the U-shaped bent portion may be arranged over an upper edge portion of the lens. With the construction set forth above, novel designs can be obtained.

Here, the frame member may be formed from one piece wire member and the pair of lens holding means may be connected to the wire member.

Further, the frame member can be formed from left and right wire members and a wire member connecting the left and right wire members, and the lens holding means may be integrally formed with respective center side end portion of the left and right wire members.

Alternately, the lens holding means may be formed with a first U-shaped bent portion and a second U-shaped bent portion continuous with the first U-shaped bent portion, both leg portions of the first U-shaped bent portions may be in contact with an inner edge portion of the lens, and one leg portion of the second U-shaped bent portion may be inserted into a lens hole.

With the construction set forth above, since only one lens hole is required to be formed in the lens, work load in formation of the lens hole can be reduced significantly.

The above and other objects, features and advantages of the present invention will become more apparent from the following description of embodiments thereof taken in conjunction with the accompanying drawings.

DESCRIPTION OF THE PREFERRED EMBODIMENT

Embodiments of the present invention will be described hereinafter with reference to the accompanying drawings.

Figure 1:
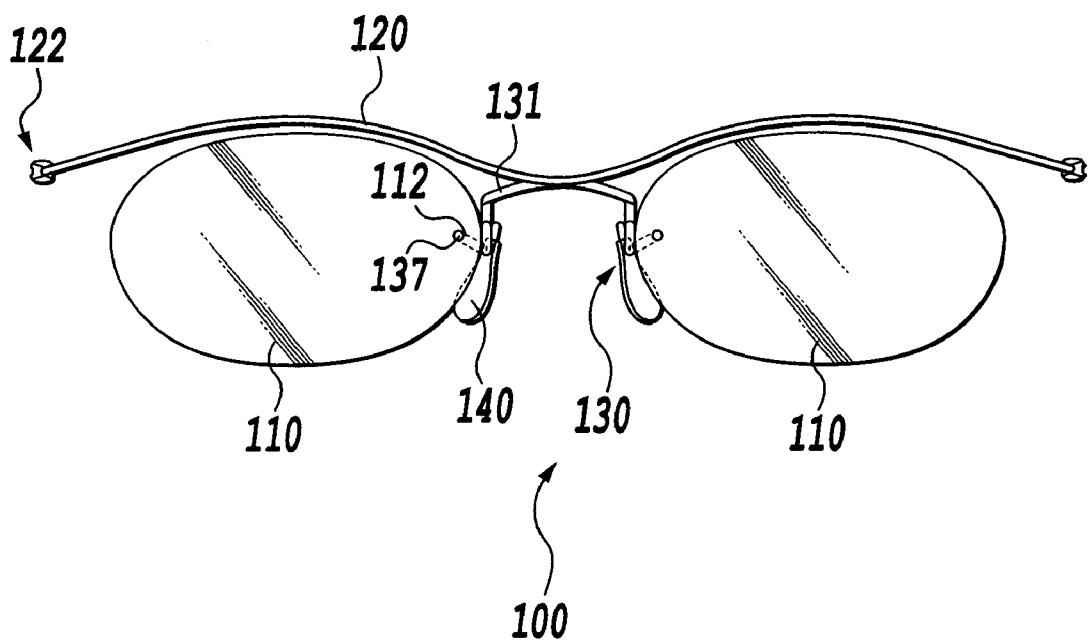
FIG. 1 is a front elevation showing the first embodiment of rimless eyeglasses according to the present invention.
Figure 2:
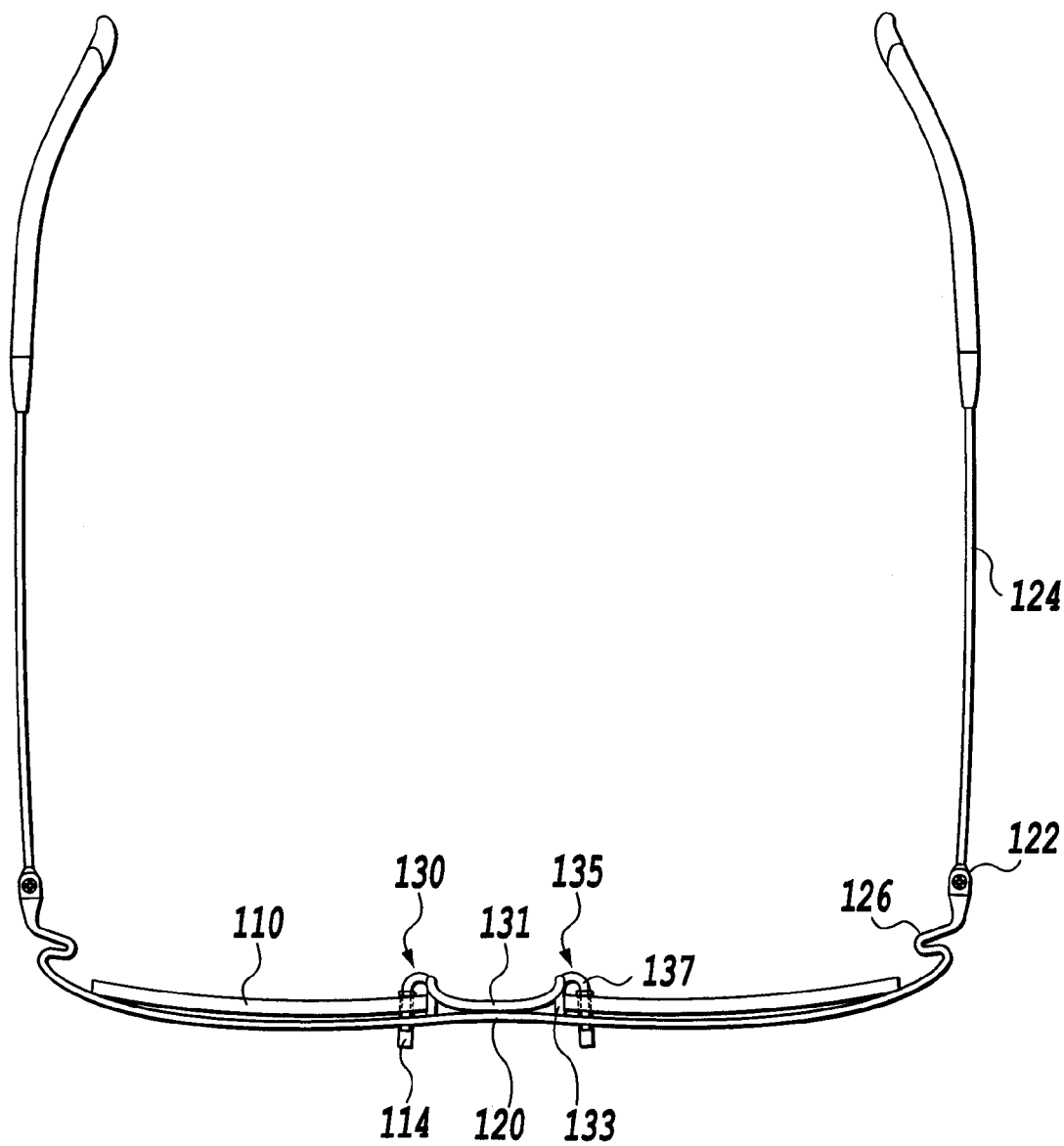
FIG. 2 is a plan view showing the first embodiment of rimless eyeglasses according to the present invention.
Figure 3:
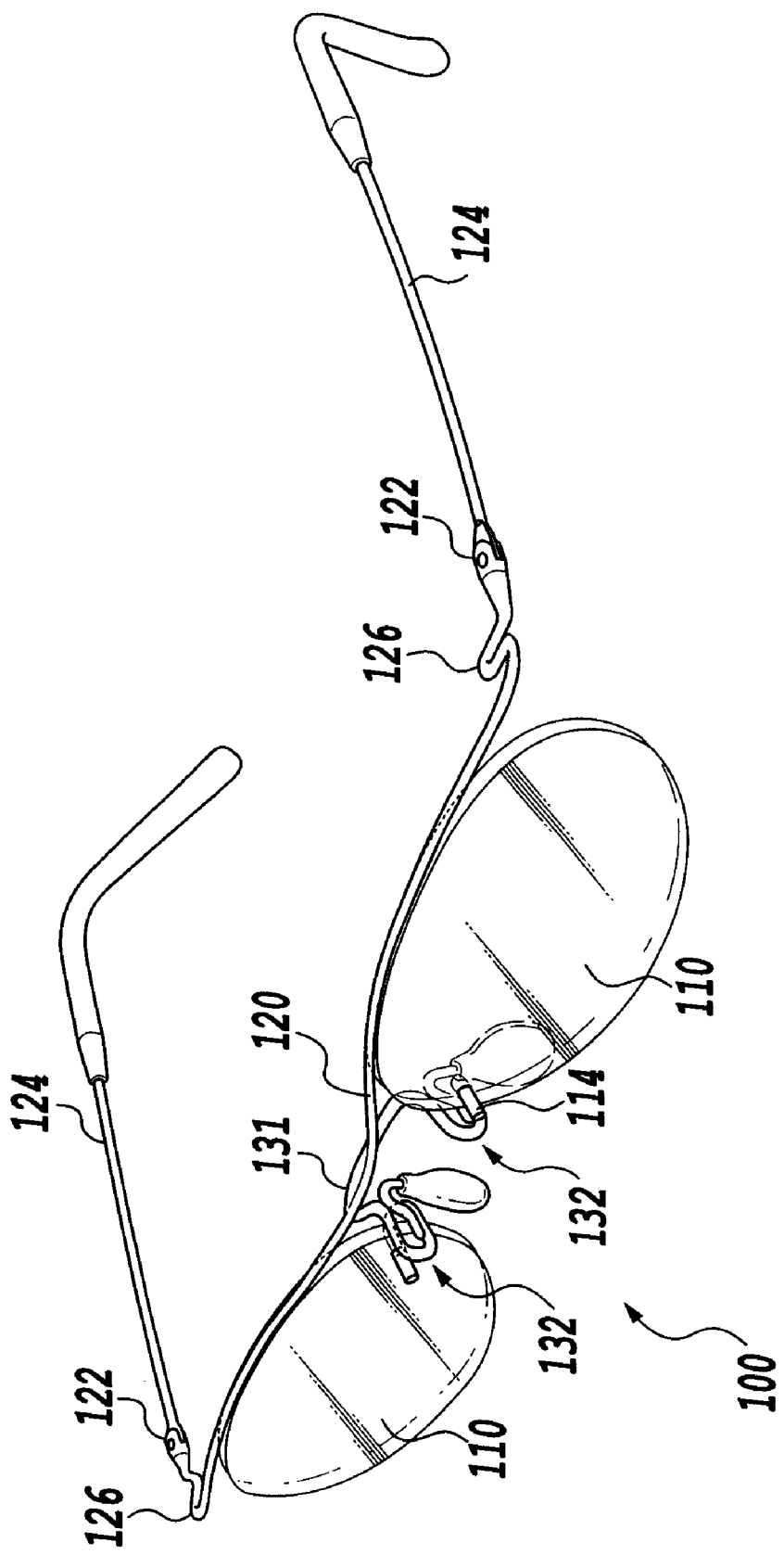
FIG. 3 is a perspective view of the first embodiment of rimless eyeglasses according to the present invention as viewed from a front upper side.
Figure 4:
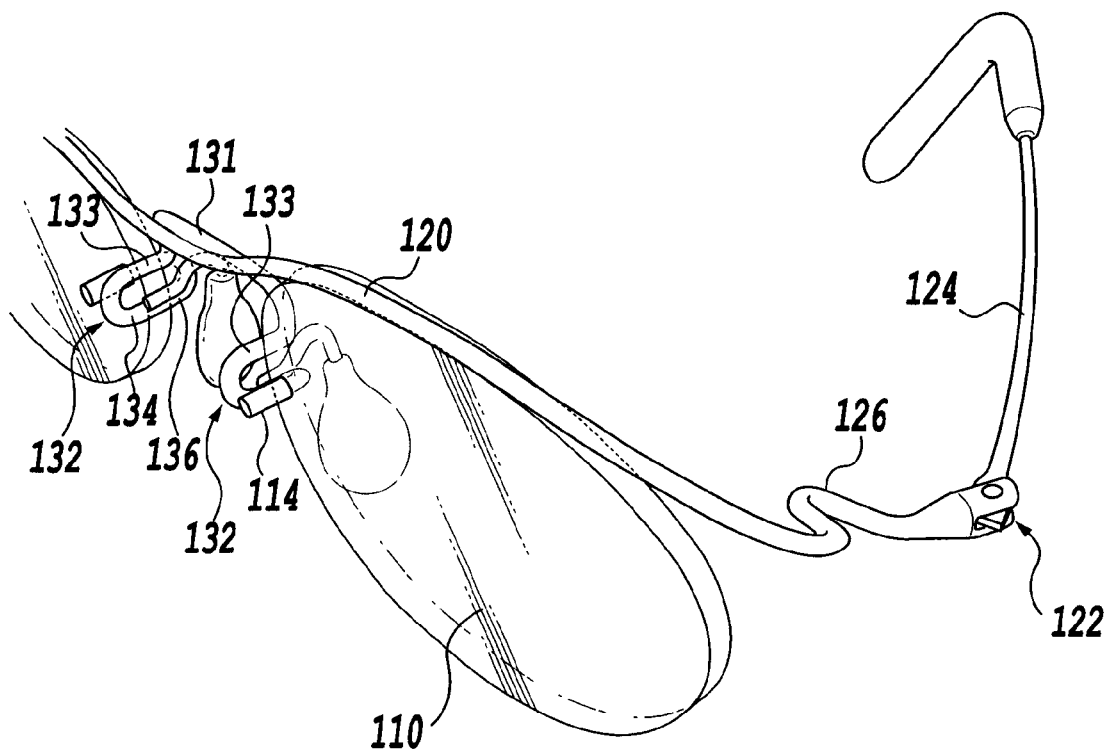
FIG. 4 is a partial enlarged view of FIG. 3.
Figure 5:
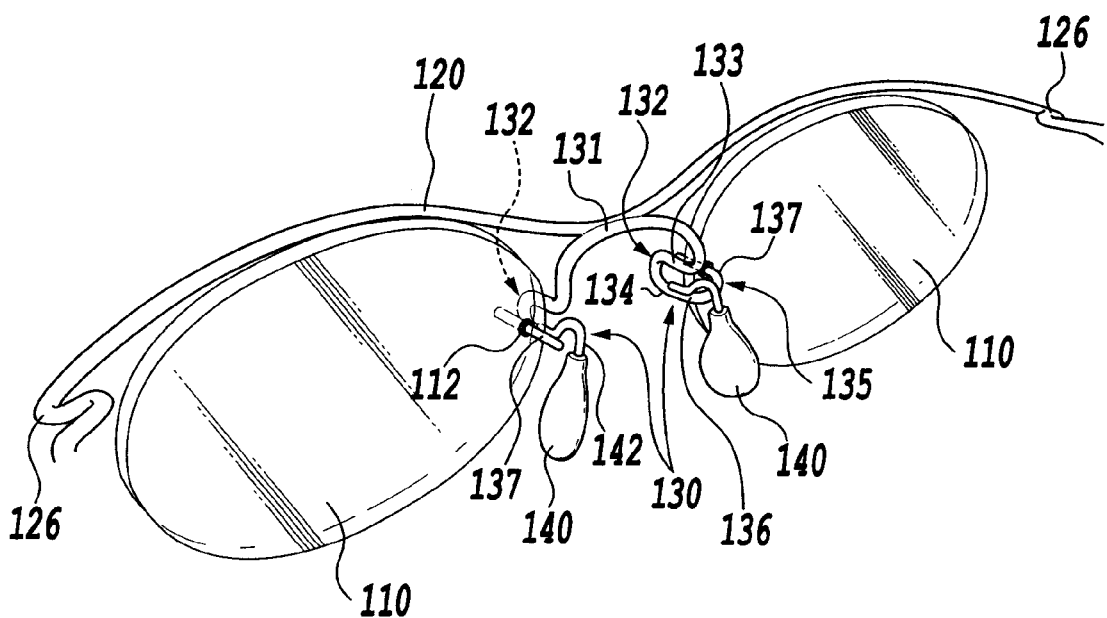
FIG. 5 is a perspective view of the first embodiment of rimless eyeglasses according to the present invention as viewed from a rear upper side.

FIGS. 1 to 5 show the first embodiment according to the present invention. Here, FIG. 1 is a front elevation showing the first embodiment of rimless eyeglasses according to the present invention, FIG. 2 is a plan view, FIG. 3 is a perspective view as viewed from a front upper side, FIG. 4 is a partial enlarged view of FIG. 3, and FIG. 5 is a perspective view as viewed from a rear upper side, respectively.

In FIGS. 1 to 5, the first embodiment of rimless eyeglasses 100 according to the present invention includes left and right lenses 110, a wire like frame member 120 having opposite ends and extending toward left and right and a pair of lens holding members 130 arranged at a center portion of the frame member 120 and holding the left and right lenses 110 in the vicinity of inner edge portions thereof.

In the lens 110, one lens hole 112 is formed only in the portion in the vicinity of inner edge portion. It should be noted that, in the lens hole 112, a synthetic resin (e.g. polycarbonate resin) sleeve 114 is fitted.

The frame member 120 is formed of one metal wire material (e.g., resilient material, such as nickel-chromium alloy, nickel-titanium alloy or the like) extending toward left and right in the shown embodiment. On opposite ends of the frame member 120, hinges 122 are provided. Then, bows 124 are connected via the hinges 122. It is also possible to form the bows 124 integral with the frame member 120 without providing the hinges 122.

Here, in the frame portion 120, between the center portion and both end portions and in the vicinity of the hinges 122, substantially U-shaped adjusting bent portions 126 are formed. The adjusting bent portions 126 are provided for deforming the frame member 120 adapting to the height of ears and/or a face width of a wearer. In the shown embodiment, both leg portions of the U-shaped adjusting bent portion 126 lie in a horizontal plane so as to overlap as viewed from a front for improving an external view.

Next, the lens holding member 130 is formed from a metal wire member (for example, a resilient member, such as nickel-chromium alloy, nickel-titanium alloy or the like) and includes first U-shaped bent portions 132 and second U-shaped bent portions 135 continuous with the first U-shaped bent portions 132. In the shown embodiment, first leg portions 133 of the first U-shaped bent portions are connected by a connecting portion 131. Then, the connecting portion 131 is fixed to the center portion of the frame member 120 by an appropriate fixing means (e.g. brazing, soldering or the like). The second leg portion 134 of the first U-shaped bent portion 132 is connected to the first leg portion 136 of the second U-shaped bent portion 135 in alignment with each other. Both of the first leg portion 133 and the second leg portion 134 of the first U-shaped bent portion are in contact with the inner edge portion of the lens 110, and second leg portion 137 of the second U-shaped bent portion 135 is inserted into the lens hole 112.

Here, the first U-shaped bent portion 132 projects forward with respect to the eyeglasses, and the first leg portion 133 and the second leg portion 134 are parallel to each other. On the other hand, the second U-shaped bent portion 135 having the first leg portion 136 continuous with the second leg portion 134 of the first U-shaped bent portion 132 in alignment, projects backward with respect to the eyeglasses, and the first leg portion 136 and the second leg portion 137 are parallel to each other. As can be clear from FIG. 1, the first leg portion 133 and the second leg portion 134 of the first U-shaped bent portion (and the first leg portion 136 of the second U-shaped bent portion 135) and the second leg portion 137 of the second U-shaped bent portion 135 form a triangle as viewed from the front side of the eyeglasses.

The reference numeral 140 denotes nose pads. In the shown embodiment, the nose pads 140 are provided on pad arms 142 each connected to a joining portion between the second leg portion 134 of the first U-shaped bent portion 132 and the first leg portion 136 of the second U-shaped bent portion 135 forming the lens holding member 130.

In the first embodiment of the present invention constructed as set forth above, by fixing a pair of lens holding members 130 connected by the connecting portion 131 and including the nose pads 140, at the central portion of the wire form frame member 120 having opposite ends and extending toward left and right, the rimless eyeglass frame is formed. When the bows 124 are formed separately, the rimless eyeglass frame is formed by connecting the bows 124 to the frame member 120 via the hinge portions 122.

Thus, by mounting the lenses 110 on a pair of lens holding members 130 of the rimless eyeglass frame, rimless eyeglasses 100 is completed. Upon mounting the lenses on the lens holding members 130, the second leg 137 of the second U-shaped bent portion 135 of the lens holding member 130 is inserted from the backside of the lens 110 into the lens hole 112 which has been formed adapting to an astigmatic axis or the like of the wearer. At the same time, the first leg portion 133 and the second leg portion 134 of the first U-shaped bent portion 132 (and also the first leg portion 136 of the second U-shaped bent portion 135) are brought into contact with the inner edge portion of the lens 110. As a result, the lens 110 is supported at three points with the leg portions of the U-shaped bent portions forming the triangle. Thus, the frame member 120 certainly holds the left and right lenses in non-contacting relation with the upper edge portions of the left and right lenses 110.

In this case, the synthetic resin sleeve 114 is preliminarily fitted into the lens hole 112 and the second leg portion 137 of the second U-shaped bent portion 135 is inserted into the sleeve 114 to prevent play or the like of the lens 110 by elasticity. Furthermore, loosening off of the lens 110 is certainly prevented by its frictional resistance.

Here, when a slight error in the forming position of the lens hole exists and a fine adjustment of the astigmatic axis is required, it is merely required to slightly deform the lens holding portion 130 for varying the shape of the foregoing triangle. Even in such case, the frame member 120 will not be affected at all.

On the other hand, upon an adjustment adapting to the height of ears or a face width, the adjustment may be performed by the U-shaped adjusting bent portion 126. Adjustment can be performed without causing any influence for the central portion of the main body of the frame member 120 and the lens holding members 130. Accordingly, the adjustment would not affect for the mounting angle of the lenses 110 relative to the frame member 120.

Figure 6:
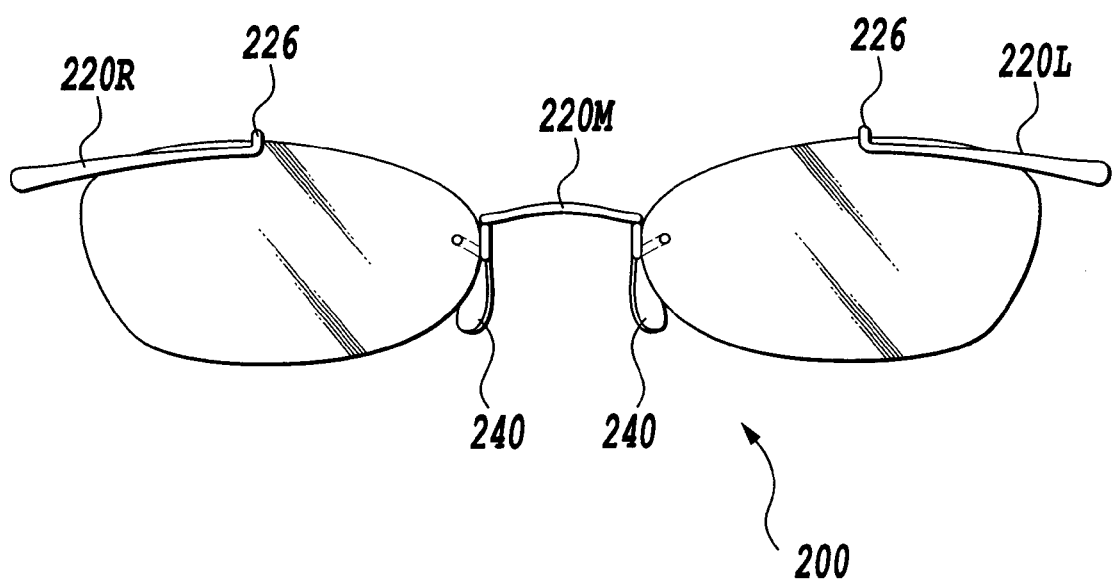
FIG. 6 is a front elevation showing the second embodiment of rimless eyeglasses according to the present invention.
Figure 7:
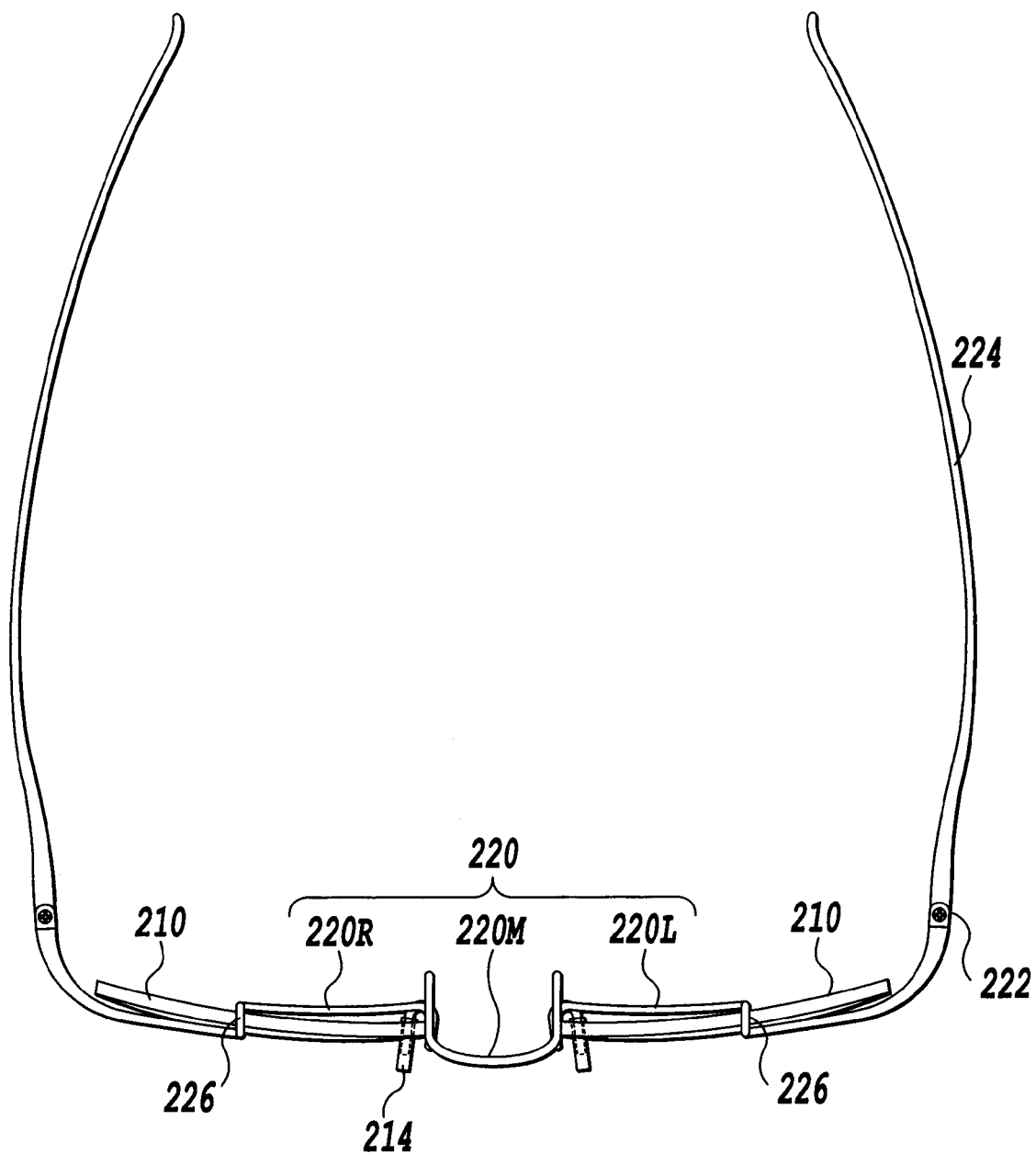
FIG. 7 is a plan view showing the second embodiment of rimless eyeglasses according to the present invention.
Figure 8:
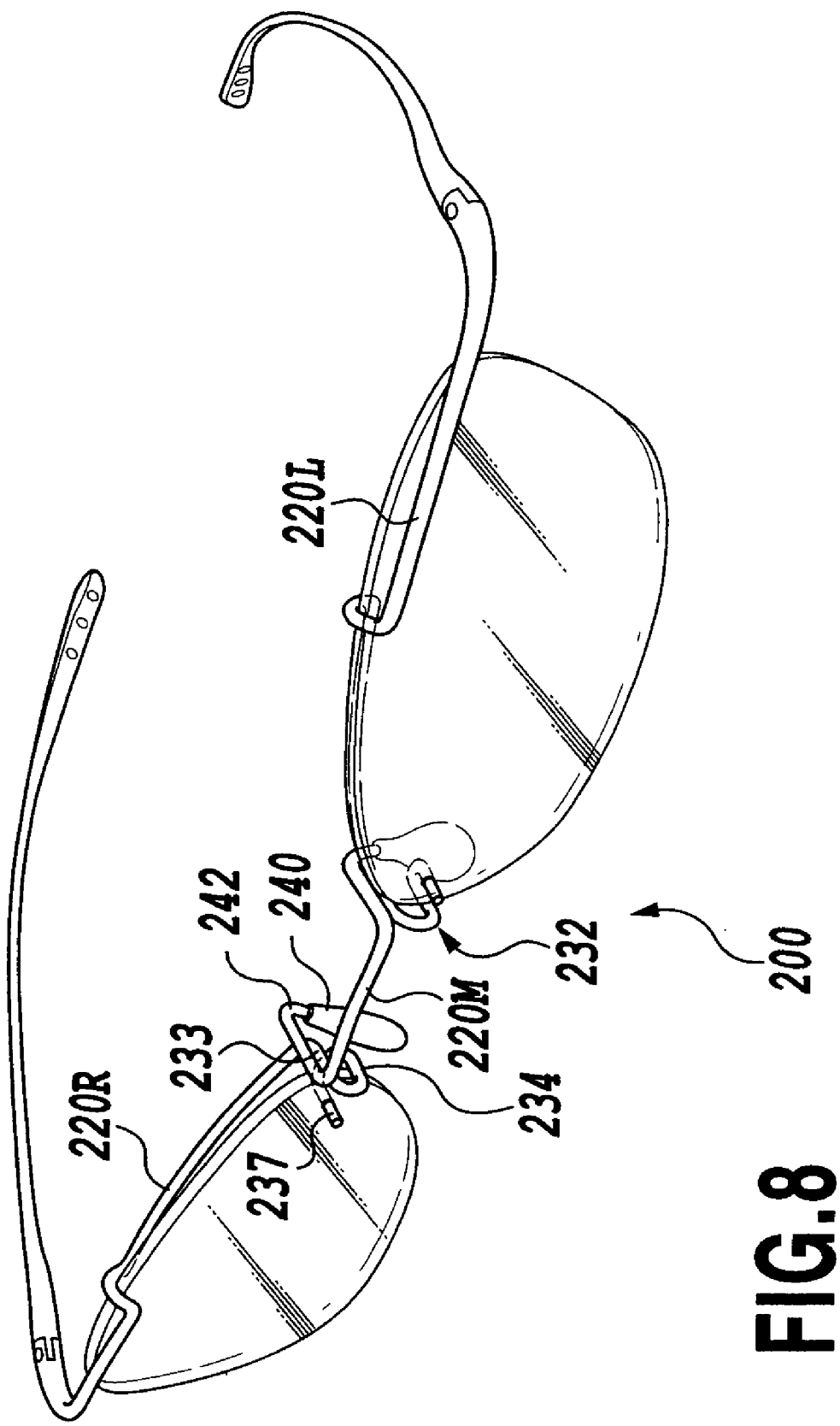
FIG. 8 is a perspective view of the second embodiment of rimless eyeglasses according to the present invention as viewed from a front upper side.
Figure 9:
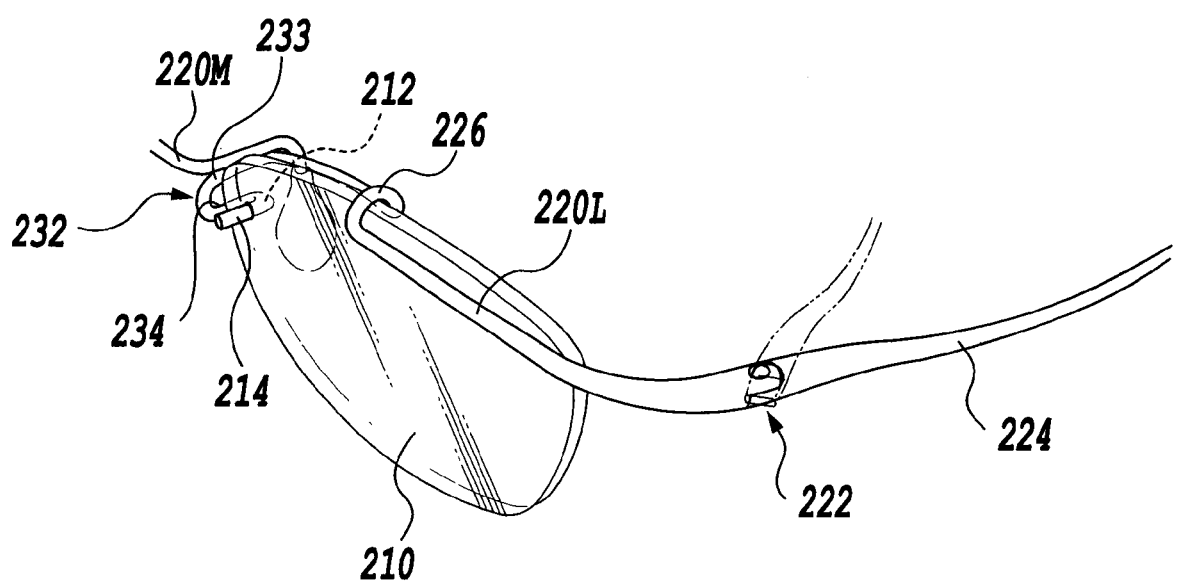
FIG. 9 is a partial enlarged view of FIG. 8.
Figure 10:
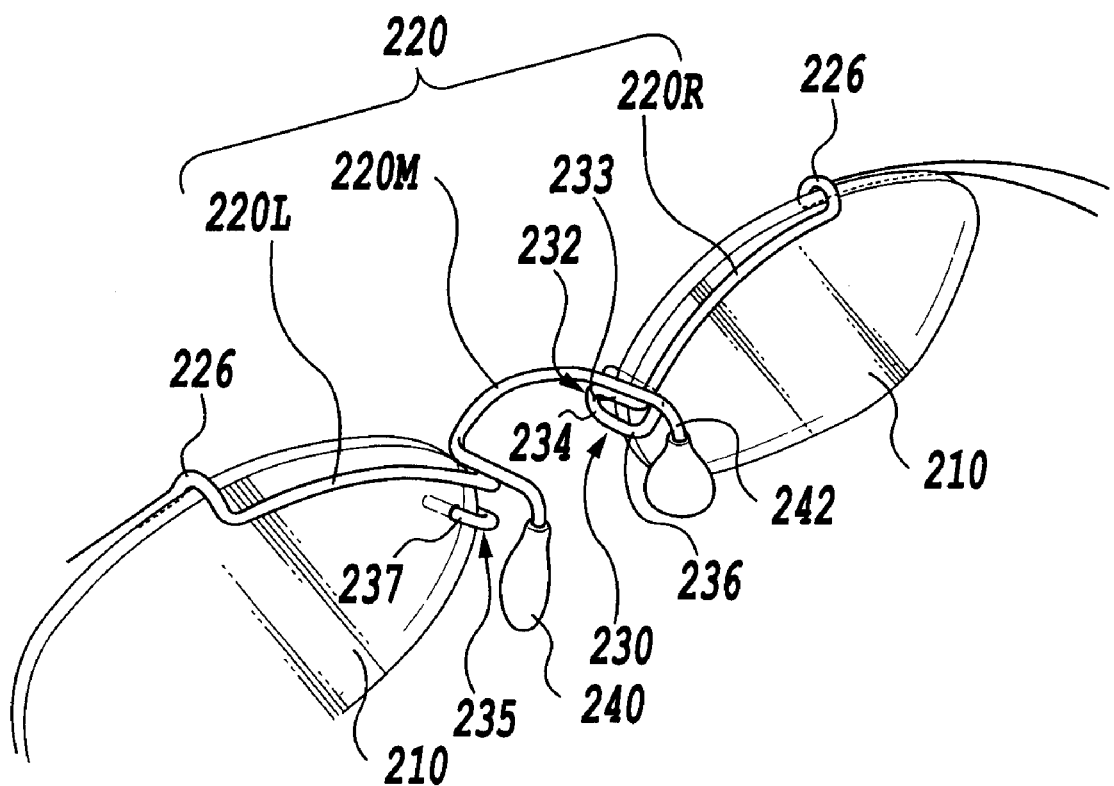
FIG. 10 is a perspective view of the second embodiment of rimless eyeglasses according to the present invention as viewed from a rear upper side.
Figure 11A:
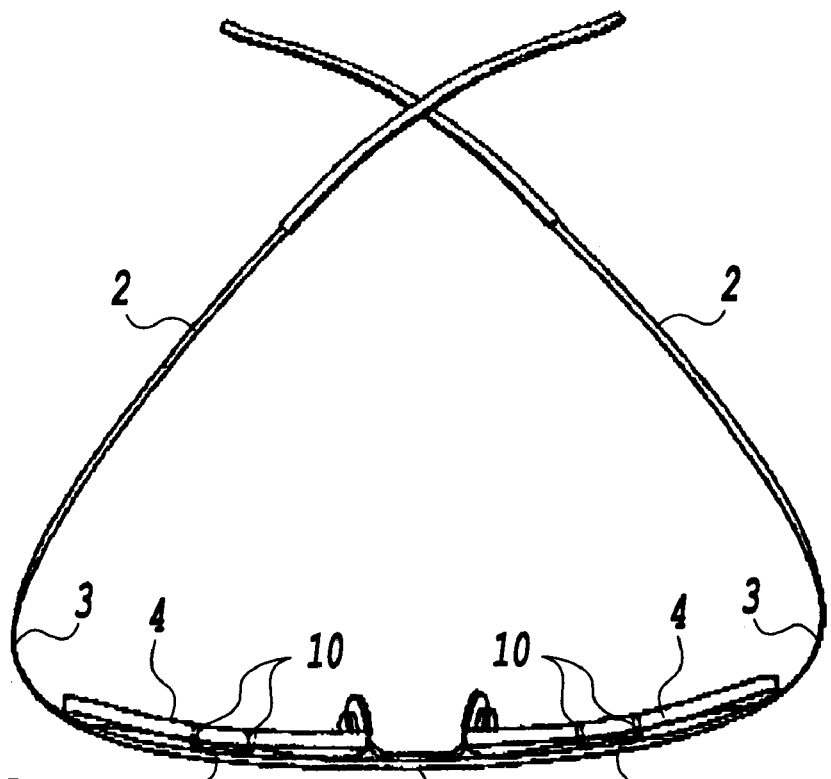
FIG. 11A is a plan view showing one example of conventional rimless eyeglasses.
Figure 11B:
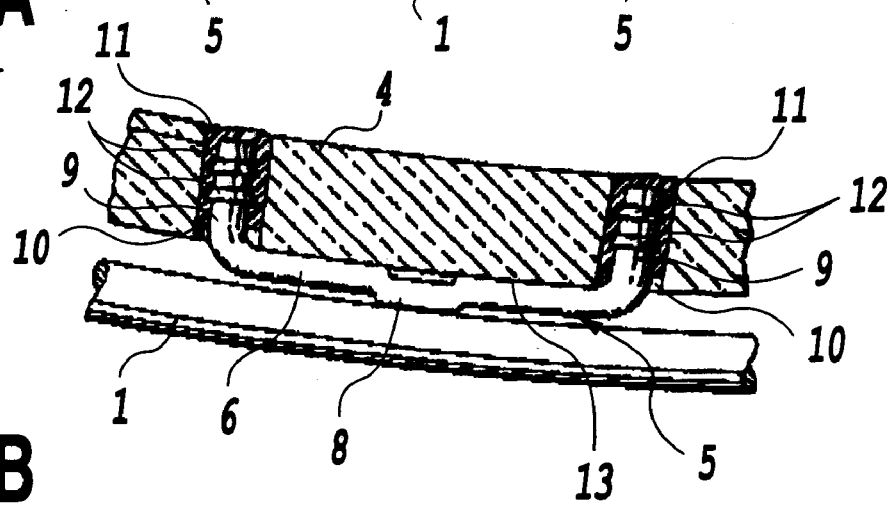
FIG. 11B is a partial enlarged section of FIG. 11A.
Figure 12:
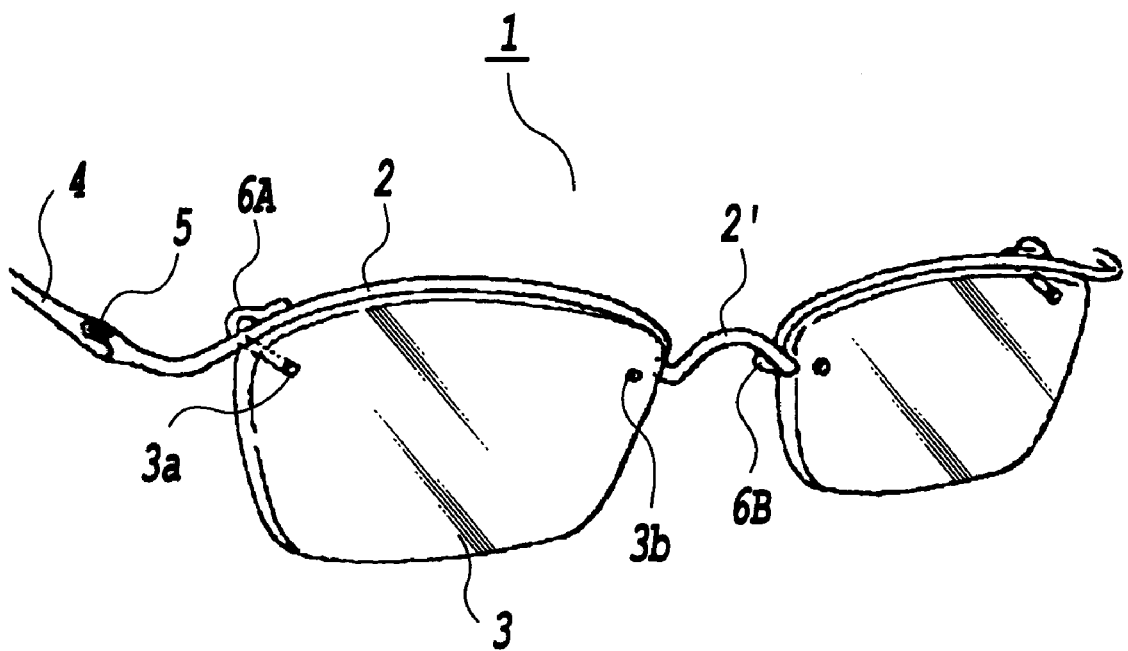
FIG. 12 is a perspective view showing another example of conventional rimless eyeglasses.

Next, FIGS. 6 to 10 show the second embodiment of the present invention. Here, FIG. 6 is a front elevation showing the second embodiment of rimless eyeglasses according to the present invention, FIG. 7 is a plan view, FIG. 8 is a perspective view as viewed from front upper side, FIG. 9 is a partial enlarged view of FIG. 8, and FIG. 10 is a perspective view as viewed from rear upper side, respectively.

It should be noted that the following description for the second embodiment uses reference numbers of two hundreds for distinguishing from those of one hundreds used in the description of the first embodiment. Furthermore, unless otherwise stated, the same numbers in the last two digits identify the same or similar components or functional parts as in the first embodiment. Therefore, except for the different points between the second embodiment and the first embodiment as will be mentioned below, an explanation made for the first embodiment is taken as an explanation for the second embodiment by replacing one hundreds with two hundreds in reference numerals.

A main difference between the second embodiment and the above first embodiment is firstly that the frame member 120 is formed from one piece metal wire in the first embodiment, whereas, a frame member 220 in the second embodiment has a three piece structure consisted of a right frame member 220R, a left frame member 220L and a bridge member 220M which serves to connect the right and left frame members 220R and 220L.

Namely, as shown in FIGS. 6 to 10, in the second embodiment, each of center side end portions of the right frame member 220R and the left frame member 220L is formed as lens a holding member 230 which will be described later. First leg portions 233 of first U-shaped bent portions 232 of a pair of lens holding members 230 are connected to corresponding leg portions of a bridge member 220M which is formed into a channel-shaped or horseshoe-like configuration as viewed from the upper side of the eyeglasses, respectively, whereby the right frame member 220R and the left frame member 220L are connected to each other, and thus the frame member 220 is formed.

It should be noted that, in this embodiment, for nose pads 240, both leg portions of the bridge member 220M are bent at the ends downwardly to form pad arms 242. The nose pads 240 are mounted on the pad arms 242. Of course, similar to the first embodiment, the pad arms 242 may be secured on any position of the lens holding member 230.

In the second different point, a pair of lens holding members 130 connected by the connecting portion 131 are fitted to the frame member 120 formed from one piece metal wire in the first embodiment, whereas, in the second embodiment, a pair of lens holding members 230 are respectively formed integrally with the right frame member 220R and the left frame member 220L with the same wire member, as mentioned above,.

Namely, the lens holding members 230 each is a part of the right frame member 220R and the left frame member 220L.Respective end portions thereof are bent to form first U-shaped bent portions 232 and second U-shaped bent portions 235 continuous with the first U-shaped bent portions 232. In this embodiment, the first leg portions 233 of the first U-shaped bent portions 232 are connected with each other via the bridge member 220M, as set forth above. The second leg portions 234 of the first U-shaped bent portions 232 and the first leg portions 236 of the second U-shaped bent portions 235 are placed continuously in alignment. The first leg portions 233 and the second leg portions 234 of the first U-shaped bent portions 232 are abutted against the inner edge portions of the lenses 210, and the second leg portions 237 of the second U-shaped bent portions 235 are inserted into the lens holes 212, in a similar manner to the former embodiment.

The third different point is that the U-shaped adjusting bent portions 126 are arranged outside of the outer edges of the left and right lenses 110 in the first embodiment, whereas, in the second embodiment, the U-shaped adjusting bent portions 226 of the left and the right frame members 220L and 220R are positioned over the upper edges of the lenses 210, respectively. It should be noted that both leg portions of the U-shaped adjusting bent portion 226 lie on a plane extending perpendicular to the lens surface so that both legs are overlapped as seen from the front side of the eyeglasses, in like fashion as the former embodiment. With such an arrangement, it is possible to hide, for instance, half of the left and right frame members 220L and 220R on the back side of the lenses 210 to create a completely novel design. Even in this case, including the U-shaped adjusting bent portions 226, the left and right frame members 220L and 220R are held non-contact with the upper edge portions of the left and right lenses 210, respectively.

Here, a mounting method of the lenses onto the frame member 210 is the same as the first embodiment. Therefore, detailed description of the mounting method will be omitted in order to avoid redundant explanation.

While the foregoing has been given in terms of the preferred embodiment of the present invention, the present invention is not limited to the above shown embodiments. Namely, it may be possible to interchangeably employ the features of the first and second embodiments set forth above. For instance, the adjusting bent portions 126 and 226 may be interchanged with each other. Also, the pad arms 142 and 242 to which are mounted the nose pads 140 and 240, respectively, may be secured on any suitable member and an appropriate position.

It should be appreciated that the non-contact structure between the frame member and the upper edge portions of the lenses is under a non-contact condition in an appropriate state where no external force acts thereon. For example, even when the frame member and the upper edge of the lens contact due to deformation of the frame member during use, a slight contact not causing fluctuation of light axes of the left and right lenses should fall within the scope of the present invention as long as the functions required in the present invention are accomplished.

The present invention has been described in detail with respect to preferred embodiments, and it will now be apparent from the foregoing to those skilled in the art that changes and modifications may be made without departing from the invention in its broader aspect, and it is the intention, therefore, in the claims to cover all such changes and modifications as fall within the true spirit of the invention.

What is claimed is:

1. A rimless eyeglass frame comprising:
   a wire form frame member having opposite end portions and extending toward left and right; and
   a pair of lens holding means arranged at a center portion of said frame member for holding lenses;
   wherein said frame member is formed by adjusting bent portions at positions between said center portion and said opposite end portions;
   and wherein each of said adjusting bent portions has a U-shaped configuration, and both leg portions of each of said U-shaped adjusting bent portion are arranged to overlap as viewed from a front side;
   and further wherein said frame member is to be in non-contact with upper edges of said lenses.

2. A rimless eyeglass frame as claimed in claim 1, wherein said U-shaped bent portion is arranged over an upper edge portion of said eyeglass lens.

3. A rimless eyeglass frame as claimed in claim 1, wherein said frame member is formed from one piece wire member and said pair of lens holding means are connected to said wire member.

4. A rimless eyeglass frame as claimed in claim 1, wherein said frame member is formed from left and right wire members and a wire member connecting said left and right wire members, and said lens holding means are integrally formed with respective center side end portions of said left and right wire members.

5. A rimless eyeglass frame as claimed in claim 1, wherein said lens holding means is formed with a first U-shaped bent portion and a second U-shaped bent portion continuous with said first U-shaped bent portion, both leg portions of said first U-shaped bent portions are to be in contact with an inner edge portion of said eyeglass lens, and one leg portion of said second U-shaped bent portion is to be inserted into a lens hole.

6. A rimless eyeglass frame as claimed in claim 1, wherein hinges are formed at opposite end portions of said frame member.

7. A rimless eyeglass frame as claimed in claim 1, wherein said U-shaped adjusting bent portions are arranged outside outer edges of said lenses.

8. Rimless eyeglasses comprising:
   left and right lenses;
   a wire form frame member having opposite ends and extending toward left and right;
   a pair of lens holding means, arranged at center portion of said frame member, for holding said left and right lenses at positions in the vicinity of inner edge portions thereof; and
   wherein said frame member is formed by adjusting bent portions at positions between said center portion and said opposite end portions;
   and and wherein each of said adjusting bent portions has a U-shaped configuration, and both leg portions of said U-shaped adjusting bent portion are arranged to overlap as viewed from a front side;
   and further wherein said frame member is in non-contact with upper edge portions of said left and right lenses.

9. Rimless eyeglasses as claimed in claim 8, wherein hinge portions are formed on opposite end portions of said frame member, and bows are connected to said frame member through said hinge portions.

10. Rimless eyeglasses as claimed in claim 8, wherein said U-shaped bent portions are arranged over upper edge portions of said left and right lenses.

11. Rimless eyeglasses as claimed in claim 8, wherein said frame member is formed of one piece wire member, and a pair of said lens holding means are connected to said wire member.

12. Rimless eyeglasses as claimed in claim 8, wherein said frame member is formed from left and right wire members and a wire member connecting said left and right wire members, and said lens holding means are integrally formed with respective center side end portions of said left and right wire members.

13. Rimless eyeglasses as claimed in claim 8, wherein said lens holding means is formed from a wire member with a first U-shaped bent portion and a second U-shaped bent portion continuous with said first U-shaped bent portion, both leg portions of said first U-shaped bent portion are in contact with an inner edge portion of said lens, and one leg portion of said second U-shaped bent portion is inserted into a lens hole formed in the vicinity of said inner edge portion of said lens.

14. Rimless eyeglasses as claimed in claim 8, wherein said U-shaped adjusting bent portions are arranged outside outer edges of said left and right lenses, respectively.

* * * * *